United States Patent
Marics

(10) Patent No.: US 6,317,883 B2
(45) Date of Patent: Nov. 13, 2001

(54) SYSTEM AND METHOD FOR CONTENT-BASED TELEVISION PROGRAM SELECTION

(75) Inventor: Monica A. Marics, Boulder, CO (US)

(73) Assignee: MediaOne Group, Inc., Englewood, CO (US)

( * ) Notice: Subject to any disclaimer, the term of this patent is extended or adjusted under 35 U.S.C. 154(b) by 0 days.

(21) Appl. No.: 09/210,497

(22) Filed: Dec. 11, 1998

(51) Int. Cl.[7] .................... H04N 5/445; G06F 13/00
(52) U.S. Cl. ................ 725/56; 725/40; 725/57; 348/564; 348/734
(58) Field of Search ................ 348/906, 12, 13, 348/734; 345/327; 725/39, 40, 45, 120, 131, 56, 57

(56) References Cited

U.S. PATENT DOCUMENTS

| | | | |
|---|---|---|---|
| 5,410,326 | * 4/1995 | Goldstein | ............... 348/134 |
| 5,515,106 | 5/1996 | Chaney et al. . | |
| 5,585,866 | 12/1996 | Miller et al. . | |
| 5,592,551 | * 1/1997 | Lett et al. | ............... 380/20 |
| 5,596,373 | 1/1997 | White et al. . | |
| 5,629,733 | 5/1997 | Youman et al. . | |
| 5,635,978 | * 6/1997 | Alten et al. | ............... 348/7 |
| 5,694,176 | 12/1997 | Bruette et al. . | |
| 5,710,601 | 1/1998 | Marshall et al. . | |
| 5,751,282 | * 5/1998 | Girard et al. | ............... 345/327 |
| 5,758,258 | 5/1998 | Shoff et al. . | |
| 5,758,259 | * 5/1998 | Lawler | ............... 455/5.1 |
| 5,781,246 | 7/1998 | Alten et al. . | |
| 5,784,095 | 7/1998 | Robbins et al. . | |
| 5,812,123 | * 9/1998 | Rowe et al. | ............... 345/327 |
| 5,850,218 | * 12/1998 | Lajoie et al. | ............... 345/327 |
| 6,002,393 | * 12/1999 | Hite et al. | ............... 345/327 |
| 6,005,565 | * 12/1999 | Legall et al. | ............... 345/327 |
| 6,037,995 | * 3/2000 | Ichifuji et al. | ............... 348/563 |
| 6,040,829 | * 3/2000 | Croy et al. | ............... 345/327 |
| 6,061,097 | * 5/2000 | Satterfield | ............... 348/569 |
| 6,118,443 | * 9/2000 | Allison et al. | ............... 345/327 |

* cited by examiner

Primary Examiner—Andrew Faile
Assistant Examiner—Kieu-Oanh Bui
(74) Attorney, Agent, or Firm—Brooks & Kushman P.C.

(57) ABSTRACT

A system and method for content-based television program selection are provided that allow a viewer to "surf" directly between programs of a desired content category. The system includes a head-end server operable to receive program signals from a programming source, and a viewer input apparatus, such as a remote controller, which is operable to generate an input signal indicating a viewer's desired program content category. The system further includes at least one set-top box, where the set-top box has a program receiver for receiving program signals from the head-end server, and a viewer input receiver for receiving the input signal from the viewer input apparatus. In addition, the set-top box includes a processor that determines whether any channels are currently showing a program of the desired content category at the time the input signal is received. If such a channel is determined, the set-top box is provided with a tuner which automatically tunes the program receiver to the determined channel. If the program showing on the determined channel is not acceptable to the viewer, the process may be repeated for the same content category or for a different content category.

18 Claims, 3 Drawing Sheets

SYSTEM AND METHOD FOR CONTENT-BASED TELEVISION PROGRAM SELECTION

TECHNICAL FIELD

This invention relates to a system and method for allowing television viewers to browse through programs having a desired content.

BACKGROUND ART

Presently, to select a program to view, many television viewers simply "channel surf", or sequentially view each channel, until they find a channel that has a desirable program. However, as the number of available channels continues to grow, channel surfing has become an increasingly inefficient method for viewers to find the type of program they want to watch. Instead, most viewers would prefer a more direct method for selecting a program to view.

Some cable television networks dedicate a specific channel to serve as an electronic program guide. Alternatively, an electronic program guide can be superimposed over a current channel as described, for example, in U.S. Pat. No. 5,635,978 issued to Alten et al. Typically, one standard program guide is provided for all viewers or subscribers to a network. These electronic program guides are usually time-based, and are scrolled continuously or periodically. Since only a few channels can be displayed at once, the time for completing one cycle of the channels can be considerable. In addition, moving back and forth between the on-screen program guide and selected programs is cumbersome. Furthermore, viewers would prefer to actually view the programs, as they can when channel surfing, in order to make their program selection.

With a such a wide range of programs offered, individual viewers usually prefer selected subsets of the available programming. In fact, viewers typically value the content of the programs above the specific channel or broadcaster providing the programs. To meet this need, customized electronic program guides have been developed in which the on-screen display includes programs from only a specific content category or a list of programs on favorite channels. See, for example, U.S. Pat. No. 5,596,373 issued to White et al., U.S. Pat. No. 5,694,176 issued to Bruette et al., and U.S. Pat. No. 5,758,259 issued to Lawler. Such specialized program guides limit somewhat the amount of information viewers must sift through to select a program. However, viewers still must move back and forth between the on-screen program guide and the selected programs, and viewers still lack real-time viewing of the programs to aid in making their selection.

DISCLOSURE OF INVENTION

Therefore, it is an object of the present invention to provide an improved system and method for content-based television program selection.

It is a further object of the present invention to provide a system and method for content-based television program selection which do not require a viewer to move back and forth between an on-screen electronic program guide and selected programs.

It is a still further object of the present invention to provide a system and method of content-based television program selection that allow a viewer to view programs in real time to aid in making a program selection.

It is another object of the present invention to provide a system and method for content-based television program selection which provide user-programmable functionality.

Accordingly, a method is provided for content-based television program selection that includes receiving an input signal from a viewer indicating a desired program content category, determining whether any channels are currently showing a program of the desired content category at the time of receiving the input signal and, if a channel is determined to be currently showing a program of the desired content category, automatically tuning to the determined channel.

In carrying out the method of the present invention, a system for content-based television program selection is provided. The system includes a head-end server operable to receive program signals from a programming source, and a viewer input apparatus operable to generate an input signal indicating a desired program content category. The system further includes at least one set-top box in communication with the head-end server and the viewer input apparatus. The set-top box includes a program receiver to receive program signals from the head-end server, and a viewer input receiver to receive the input signal from the viewer input apparatus. In addition, the set-top box includes a processor in communication with the program receiver and the viewer input receiver, where the processor functions to determine whether any channels are currently showing a program of the desired content category at the time the input signal is received. Further, a tuner is provided which is operable to automatically tune the program receiver to any determined channels.

In operation, the system and method of the present invention allow a viewer to select a desired content category of programming, preferably by depressing a content category key on a remote controller. Upon receiving an input signal indicative of this selection, the processor determines whether any channels are currently showing a program of the desired content category. To identify programs currently showing, the processor identifies programs having a running period which includes the current time. Next, from the programs currently showing, the processor determines whether any channels are showing programs having the desired content category. If such a channel is determined, the tuner automatically tunes the program receiver to the determined channel. In a preferred embodiment, the determined channel is the next consecutive channel, starting from the current channel and moving in either an ascending or descending order, currently showing a program of the desired content category. If the program shown on the determined channel is not acceptable to the viewer, the viewer simply depresses the same content category key again and the process is repeated.

The above objects and other objects, features, and advantages of the present invention are more readily understood from a review of the attached drawings and the accompanying specification and claims.

BEST MODE FOR CARRYING OUT THE INVENTION

Figure 1:
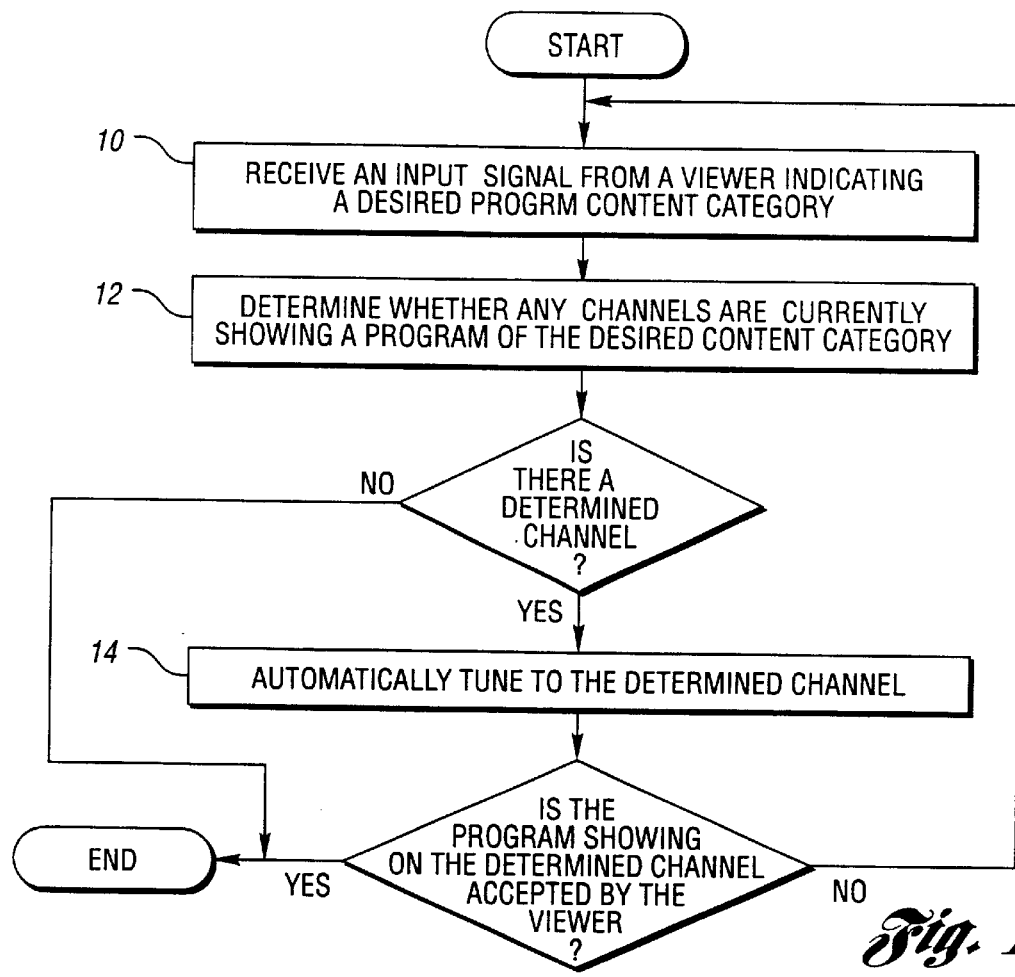
FIG. 1 is a flow diagram outlining the method of the present invention.

Referring to FIG. 1, a flow diagram outlining the general method of content-based television program selection is illustrated. The method includes receiving an input signal from a viewer indicating a desired program content category, as shown in block 10. Next, as shown in block 12, the method includes determining whether any channels are currently showing a program of the desired content category at the time of receiving the input signal. If a channel is determined to be currently showing a program of the desired content category, the method further includes tuning to the determined channel, as shown in block 14. If the viewer determines that the program showing on the determined channel is not acceptable, the process may be repeated for the same content category or for a different content category.

Figure 2:
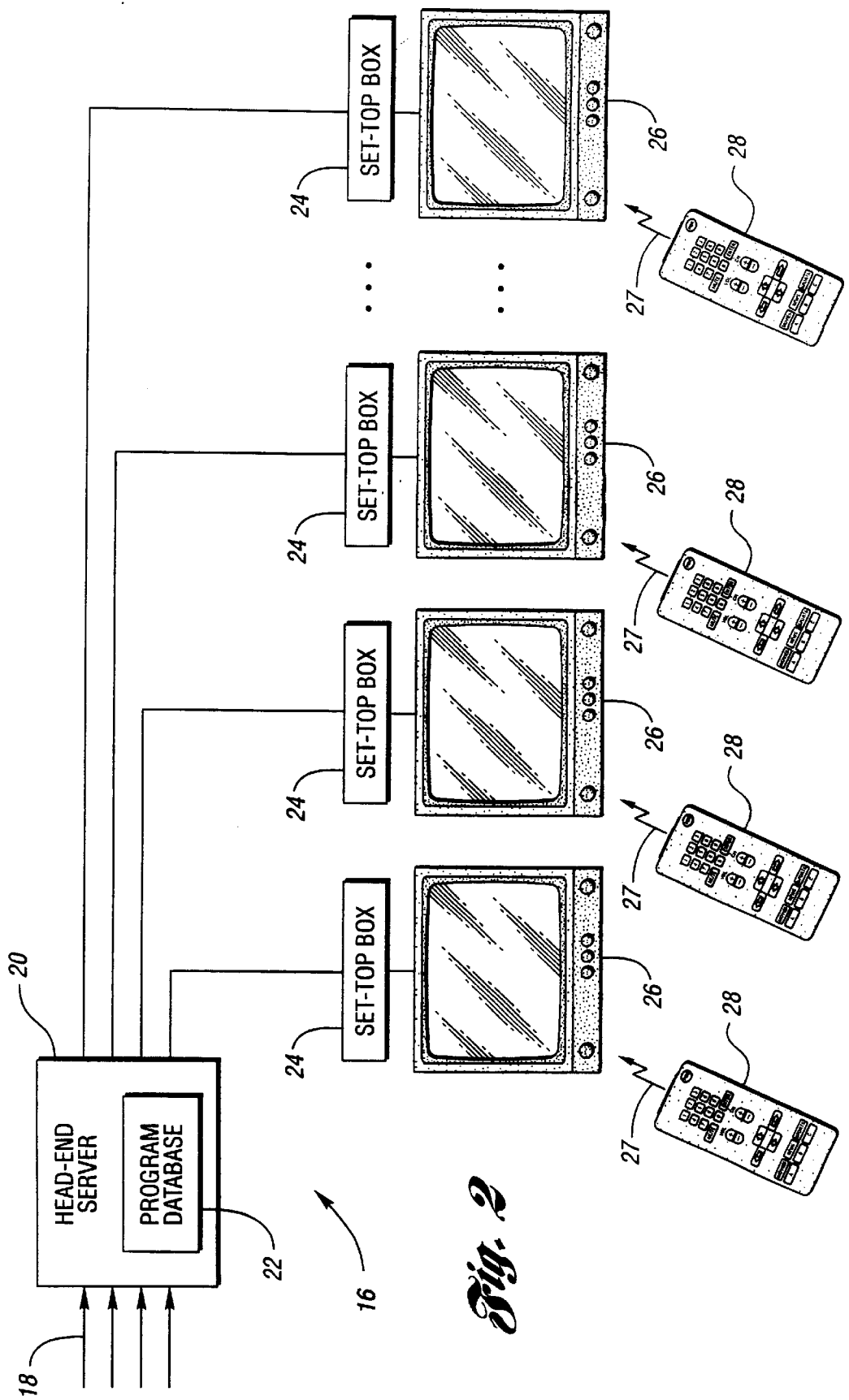
FIG. 2 is a block diagram providing an overview of the system of the present invention.

In practicing the method of the present invention, a cable television network 16 is utilized, as depicted in FIG. 2. In operation, program signals 18 are transferred from a programming source, such as an uplink (not shown), to at least one head-end server 20. Program signals 18 include video signals, audio signals, and program information for all channels available on cable television network 16. Transmission may occur via satellite or through cables, however, the system and method of the present invention are not dependent upon the particular means of transmission or reception. Head-end server 20 includes a program database 22 that stores the program information, including the running period (as determined by the program start time and end time) and content category of each program available during a particular time frame, such as one day.

Still referring to FIG. 2, head-end server 20 is in communication with a plurality of set-top boxes 24, and each set-top box 24 is coupled to one or more monitors, preferably televisions 26. Set-top box 24 receives program signals 18 from head-end server 20 and controls which programs are displayed on associated televisions 26. As an alternative to the separate housing of set-top box 24, system components could be included in another signal reception or processing device, such as a satellite receiver, a television receiver, or a VCR. Set-top box 24 is responsive to input signals 27 supplied by a viewer input apparatus, such as a remote controller 28. Of course, another type of viewer input apparatus, such as a keypad on set-top box 24, could be used to practice the present invention.

Figure 3:
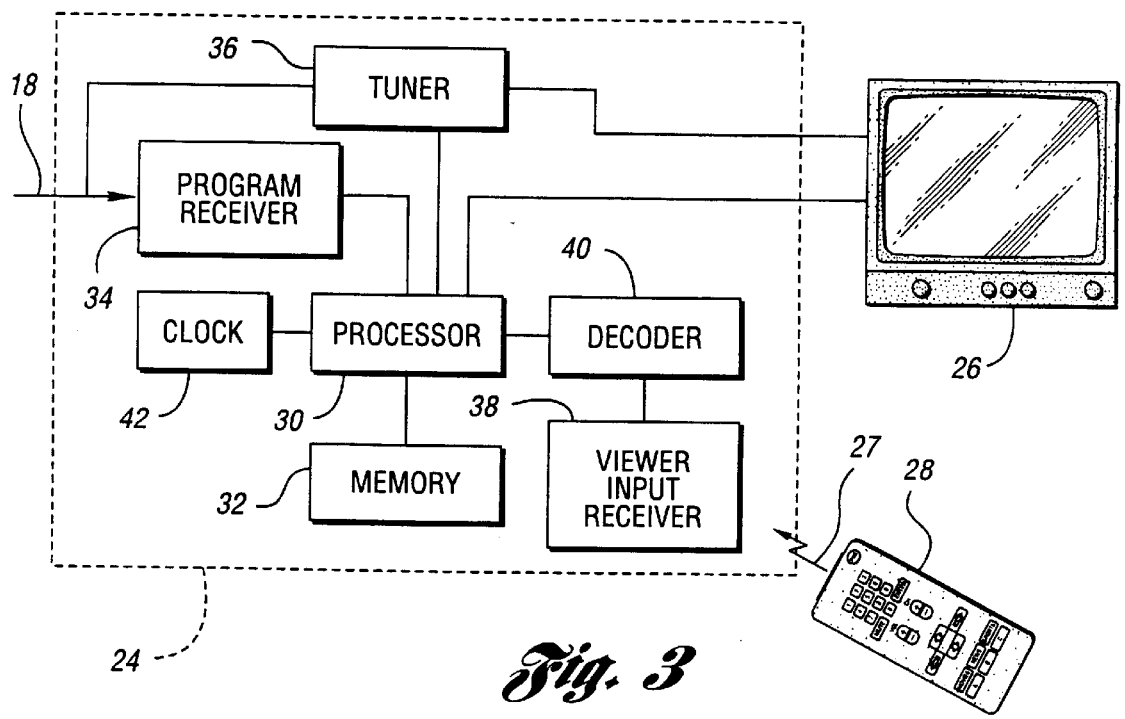
FIG. 3 is a block diagram showing a more detailed view of various components the system of FIG. 2.

Referring now to FIG. 3, a more detailed view of the components of set-top box 24 is shown. A processor 30 in conjunction with a memory system 32 control the operation of set-top box 24. Set-top box 24 further includes a program receiver 34 which operates to receive program signals 18 from head-end server 20 for all channels to which a particular viewer has access. Depending on the particular viewer, available channels may or may not include premium channels or pay-per-view channels. Under the control of processor 30, program information received by program receiver 34 is stored in memory 32. The program information is preferably downloaded from program database 22 at head-end server 20 to set-top box 24 using a prearranged schedule, for example, at 2 a.m. each morning for the next day's programming. In addition, set-top box 24 is provided with a tuner 36 for tuning program receiver 34 to selected channels.

As shown in FIG. 3, set-top box 24 is also provided with a viewer input receiver 38 and associated decoder 40. Viewer input receiver 38 receives input signals 27 from remote controller 28, and decoder 40 converts input signals 27 to digital information for delivery to processor 30. Remote controller 28 functions in a conventional manner, transmitting signals via infrared, radio frequency, or other signaling technology. In a preferred embodiment, viewer input receiver 38 is an infrared receiver, and input signals 27 are infrared signals.

Figure 4:
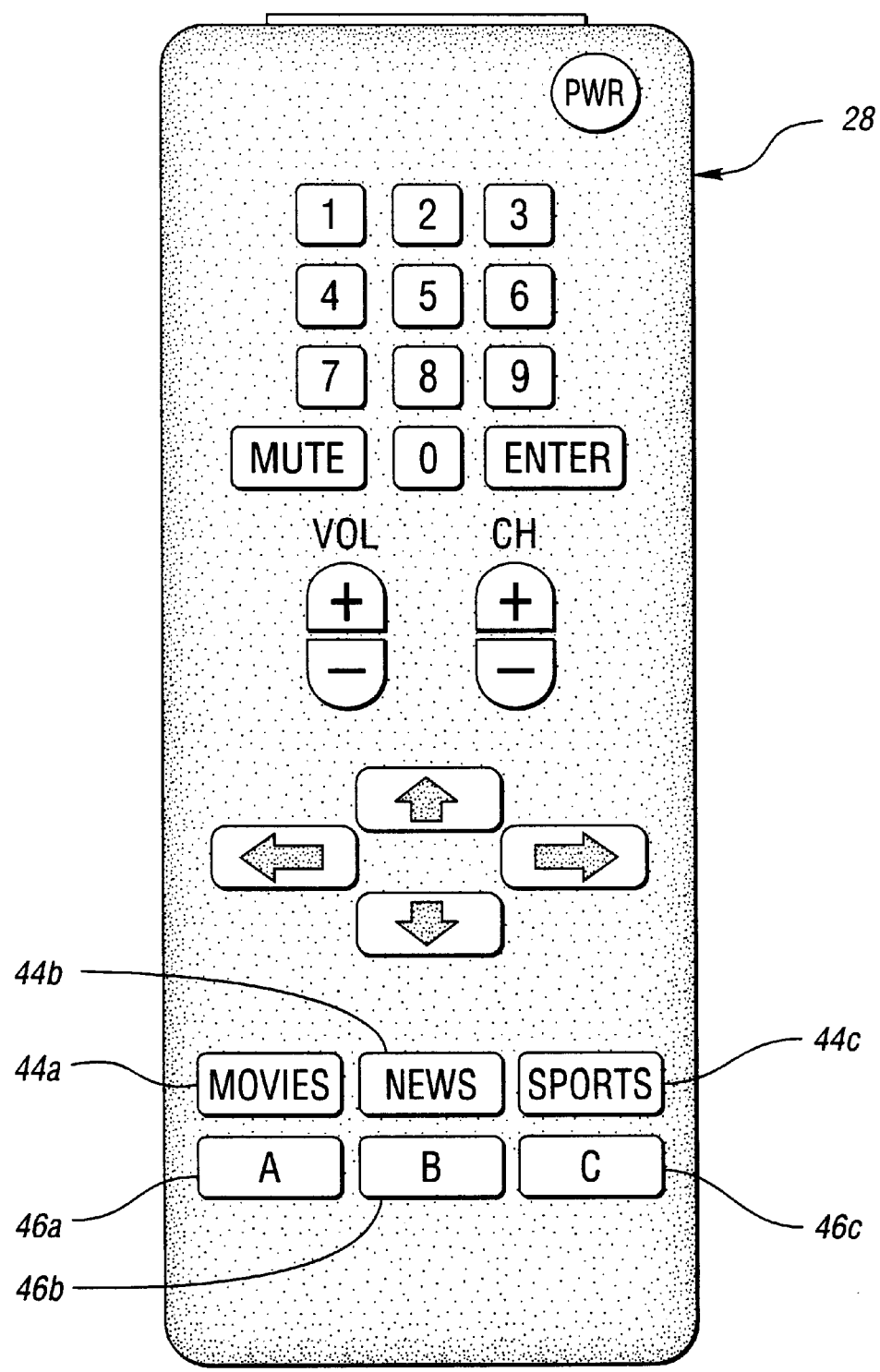
FIG. 4 depicts a preferred embodiment of a remote controller for use with the present invention.

Referring now to FIG. 4, remote controller 28 is preferably provided with conventional function keys, such as power, volume, channel, and 0–9 digit keys among others. In addition, remote controller 28 is provided with designated keys which represent specific program content categories, such as "MOVIES" 44a, "NEWS" 44b, and "SPORTS" 44c. Upon receiving an input signal generated in response to the depression of any one of content category keys 44a–c, processor 30 functions to determine whether any channels are currently showing a program of the desired content category.

To determine which programs are currently showing, processor 30 searches the program information stored in memory 32 to identify a set of programs which have a running period which includes the current time, as provided by a clock 42. Next, from the set of programs currently showing, processor 30 determines whether any programs have a content category that matches the content category desired by the viewer. In a preferred embodiment, processor 30 obtains the current channel from tuner 36 and determines if a channel other than the current channel is showing a program matching the desired criteria. If such a channel is determined, tuner 36 automatically tunes program receiver 34 to the determined channel. In a preferred embodiment, the determined channel is the next consecutive channel, starting from the current channel and moving in either an ascending or descending order, currently showing a program of the desired content category.

If the viewer is not satisfied with the program showing on the determined channel, the viewer can again depress the same content category key 44a–c on remote controller 28, causing the process to be repeated. In this case, processor 30 will again determine whether any channels are currently showing a program of the desired content category. Again, starting from the current channel, processor 30 will preferably determine the next consecutive channel currently showing a program of the desired content category. Therefore, if the process is repeated for the same content category a number of times, processor 30 selects appropriate channels in a predictable ascending or descending sequence.

In a preferred embodiment, limited on-screen information such as the title, running time, and rating (if applicable) of the program would be briefly shown on-screen over the program for viewer reference. Of course, processor 30 may determine that no channels are currently showing a program having the desired content category at the time of receiving the input signal. In this case, the process would end (FIG. 1), and preferably the viewer would be notified of this outcome. For instance, an on-screen message indicating the lack of desired programming at the current time could be displayed.

Therefore, using the system and method of the present invention, viewers can easily "surf" between channels currently showing programs of a desired content category. For example, if a viewer were to press MOVIE key 44a on remote controller 28 at 8:40 p.m. on a given night, set-top box 24 would receive an input signal 27 at viewer input receiver 38. Input signal 27 would be decoded by decoder 40 to determine the program content category desired, in this example "MOVIES", and that information would be sent to processor 30. Using the program information stored in memory 32, processor 30 would then determine whether any channels were showing movies at the current time of 8:40 p.m. If such a channel were determined, processor 30 would then send the determined channel number to tuner 36, and tuner 36 would automatically tune program receiver 34 to the determined channel. If the movie showing on the determined channel was not acceptable to the viewer, the viewer could press MOVIE key 44a again and the process would be repeated.

In addition to fixed-label content category keys 44a–c provided on remote controller 28, remote controller 28 may also include user-programmable content category keys, represented as keys "A" 46a, "B" 46b, and "C" 46c in FIG. 4. Through a sequence of keypresses, viewers could assign a content category of their choosing to keys 46a–c. For example, keys "A", "B", and "C" could be assigned by a viewer to represent the content categories of "KIDS", "SOAP OPERAS", and "MUSIC." Alternatively, user-programmable keys 46a–c could be assigned to represent subcategories of fixed label content keys 44a–c, such as "HORROR MOVIES", "LOCAL NEWS", and "BASKETBALL". Still further, a user-programmable key 46a–c could be assigned to represent a viewer's favorite programs.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A method for content-based television program selection, comprising:

receiving program signals for all channels to which a viewer has access, the program signals including program information;

receiving an input signal from the viewer indicating a desired program content category of a plurality of content categories without requiring a display of the plurality of content categories to the viewer;

searching the program information and determining whether any of the received channels are currently showing a program of the desired content category at the time of receiving the input signal; and if a channel is determined to be currently showing a program of the desired content category, automatically tuning to the determined channel.

2. The method of claim 1, wherein determining any channels includes determining any channels other than a current channel.

3. The method of claim 2, wherein determining any channels other than a current channel includes determining a next consecutive channel starting from the current channel.

4. The method of claim 1, wherein determining any channels includes comparing a current time to a running period of a program.

5. The method of claim 1, wherein receiving an input signal includes receiving an input signal generated by depressing a content category key on a viewer input apparatus.

6. The method of claim 1, further comprising displaying the program currently showing on the determined channel.

7. The method of claim 6, further comprising displaying the program information of the program currently showing on the determined channel.

8. A system for content-based television program selection, comprising:

a head-end server operable to receive program signals from a programming source, the program signals including program information;

a viewer input apparatus operable to generate an input signal indicating a desired program content category of a plurality of content categories without requiring a display of the plurality of content categories to the viewer; and at least one set-top box in communication with the head-end server and the viewer input apparatus, the at least one set-top box including a program receiver to receive program signals and corresponding program information from the head-end server for all channels to which a viewer has access, a viewer it receiver to receive the input signal from the viewer input apparatus, a processor in communication with the program receiver and the viewer input receiver to search the program information and determine whether any of the received channels are currently showing a program of the desired content category at the time the input signal is received, and a tuner operable to automatically tune the program receiver to any determined channels.

9. The system of claim 8, wherein the head-end server includes a program database from which the program information can be downloaded to the set-top box.

10. The system of claim 8, wherein the set-top box further comprises a memory to store the program information.

11. The system of claim 8, wherein the set-top box includes a clock in communication with the processor.

12. The system of claim 8, wherein the viewer input apparatus comprises a remote controller.

13. The system of claim 8, wherein the viewer input apparatus comprises a keypad on the set-top box.

14. The system of claim 8, wherein the viewer input apparatus includes fixed-label keys representing designated content categories.

15. The system of claim 8, wherein the viewer input apparatus includes user-programmable keys to which content categories can be assigned.

16. The system of claim 8, wherein the input signal is an infrared signal and the viewer input receiver is an infrared receiver.

17. The system of claim 8, further comprising a decoder in communication with the viewer input receiver and the processor.

18. The system of claim 8, further comprising a monitor in communication with the set-top box to display the program showing on the determined channel.

* * * * *

UNITED STATES PATENT AND TRADEMARK OFFICE
CERTIFICATE OF CORRECTION

PATENT NO.   : 6,317,883 B2                                                    Page 1 of 1
DATED        : November 13, 2001
INVENTOR(S)  : Monica A. Marics It is certified that error appears in the above-identified patent and that said Letters Patent is hereby corrected as shown below:

<u>Column 6,</u>
Line 18, after "viewer" delete "it" and insert -- input --.

Signed and Sealed this

Eleventh Day of June, 2002

Attest:

Attesting Officer

JAMES E. ROGAN
*Director of the United States Patent and Trademark Office*